INVENTOR.
JOHN R. JOHNSON
ROBERT F. GOODWIN
BY
Christie, Parker & Hale
ATTORNEYS

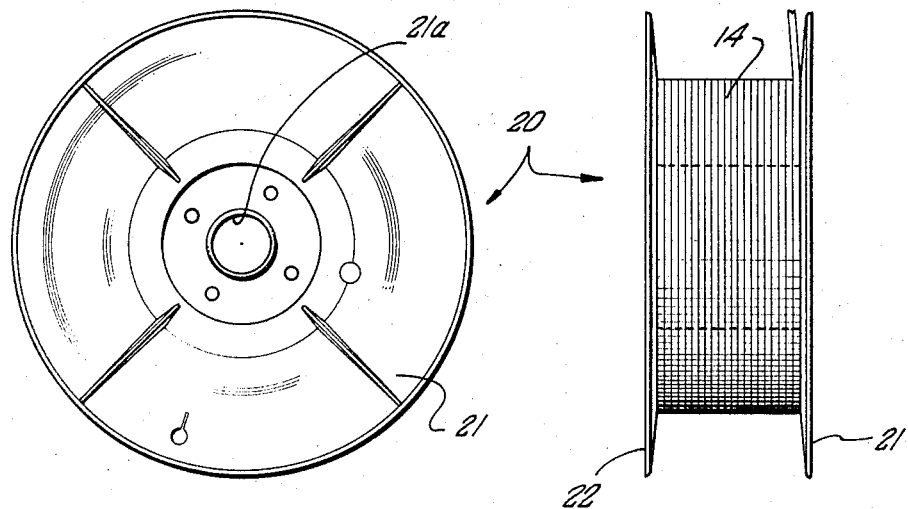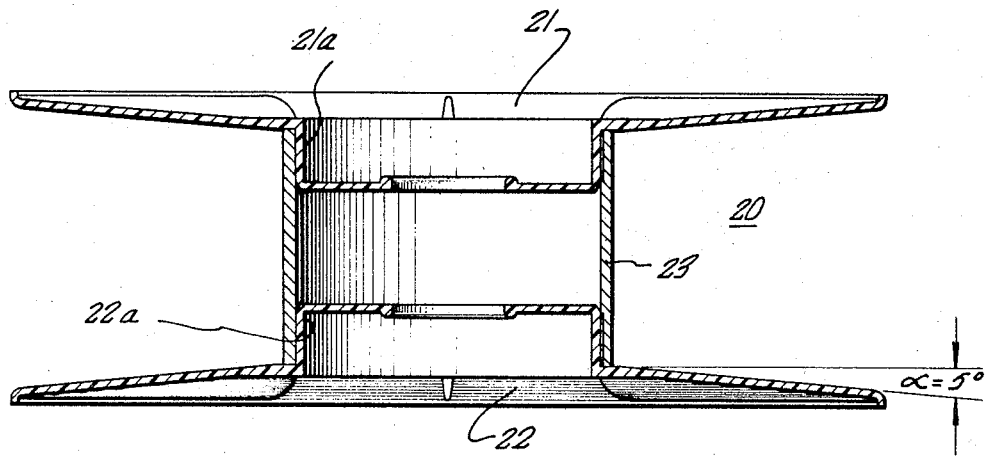

United States Patent Office 3,430,893
Patented Mar. 4, 1969

3,430,893
WOUND PACKAGE
John R. Johnson, Arcadia, and Robert F. Goodwin, Santa Ana, Calif., assignors to Royal Industries, Pasadena, Calif., a corporation of California
Continuation of application Ser. No. 550,530, May 16, 1966. This application Oct. 12, 1967, Ser. No. 674,844
U.S. Cl. 242—159      3 Claims
Int. Cl. B65h 55/00, 75/14

ABSTRACT OF THE DISCLOSURE

A wound package including ribbon-like tying material wound on a spool in overlying convolutions, the spool having flanges defined with a draft extending outwardly of the wound material to allow the material to be freely wound and unwound from the spool without binding.

---

This application is a continuation of the copending application bearing Ser. No. 550,530, filed May 16, 1966, entitled, Spool Assembly, and assigned to the same assignee as the present application.

This invention relates to a spool assembly and more particularly to a spool adapted for storing tie material capable of being tied by twisting.

At the present time there is an extensive use of tie material capable of being tied by twisting. The tie material comprises a wire reinforced paper or plastic strip that is defined to be tied by twisting. With the availability of such a tying material, machines have been developed for automatically tying an article by the use of such tying material. These automatic tying machines employ continuous lengths of the tie material and which material is stored on a conventional spool. These spools may store on the order of 2,500 feet of tying material. These tying machines are adapted to receive an article, such as a bag to be tied, and to tie the material around the article by twisting the tying material upon itself severing the material from the continuous length stored on the spool assembly. It should be appreciated that in the operation of these machines the tie material is intermittently fed to the tying station to be twisted into a tie and severed from the spool assembly. The spools employed in these machines, heretofore, have been of conventional construction and have been mounted so as to be rotatable and allow the material to be delivered therefrom by rotating the spool through the application of tension to the free end of the continuous length of tying material. It has been found that in order to properly advance the tie material from the spool assembly additional instrumentalities such as tension control devices and braking apparatus for use with the spools and the tying material is necessary. These devices are necessary due to the sudden demand on the spool for tying material and the tendency of the material to find its way between the end plate of the spool assembly and the remaining material stored on the spool thereby rendering the tying machine inoperative.

The present invention provides an improved spool assembly that is particularly adapted for use with a high speed tying machine employing wire reinforced tying material and a spool assembly that eliminates the need for any additional instrumentalities such as tension control devices for rendering the tie machine operative at all times. The spool assembly of the present invention is particularly adapted for storing tie material of the type capable of being tied by twisting. The basic construction of the spool assembly allows the tie material to be fed from the spool at high speed without any locking-up of the tie material between the side plates of the spool assembly and the remaining material stored thereon.

From a structural standpoint the spool assembly of the present invention comprises a tubular member and a pair of side plates having outwardly extending hubs adapted to be interfitted into the opposite ends of the tubular member whereby the tubular member stores the tie material between the side plates. Each of the side plates are provided with an aperture coaxial with the tubular member to allow the spool assembly to be rotatably mounted on a tying machine. Each of the end plates are further defined with a draft extending outwardly relative to the tubular member and which draft may be on the order of 5 degrees for preventing the tie material from binding between the end plates and the remaining portion of the tie material stored on the tubular member proper.

These and other features of the present invention may be more fully appreciated when considered in the light of the following specification and drawings, in which:

FIG. 4 is a side elevational view of a spool assembly embodying the present invention;

FIG. 5 is an end view of the spool assembly of FIG. 4 showing the wire reinforced ribbon stored thereon; and FIG. 6 is a cross-sectional view, with portion in elevation of the spool assembly of FIGS. 4 and 5 and illustrating the angle of draft, $\alpha$.

Figure 1:
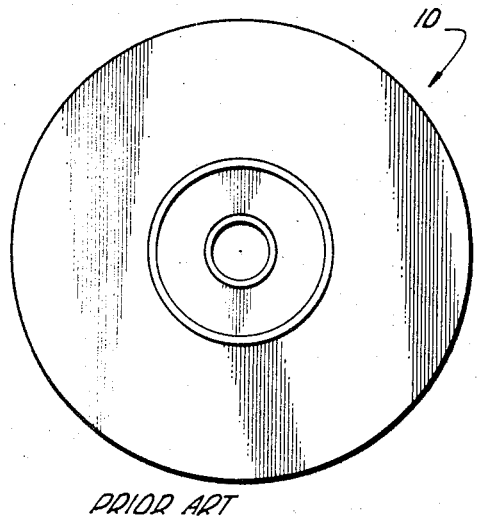
FIG. 1 is a side elevational view of the end plate of a prior art spool assembly.
Figure 2:
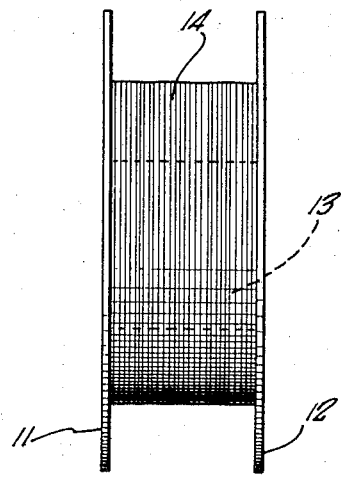
FIG. 2 is an end view of a prior art spool assembly showing the tying material in the form of a wire reinforced ribbon stored thereon.
Figure 3:
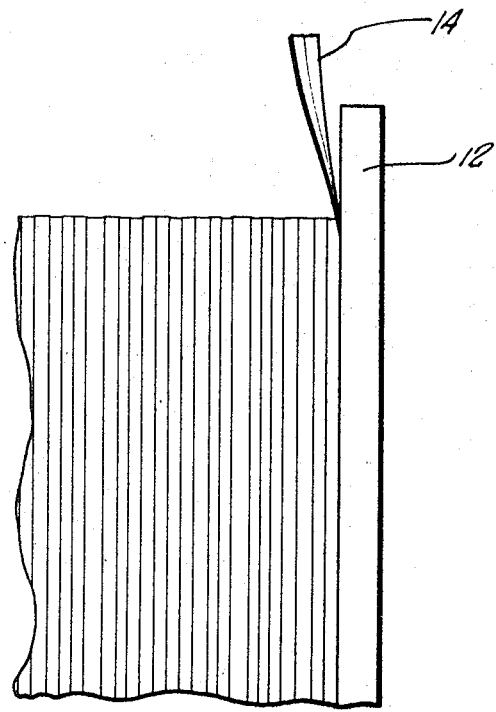
FIG. 3 is a partial, enlarged view of the spool assembly of FIG. 2 showing the wire reinforced ribbon locked between the end plate and the remaining material stored on the spool assembly.

Now referring to the drawings wherein FIGS. 1 through 3 illustrate a typical prior art type of spool assembly and one that is presently commonly used in the high speed tying machines employing a tie material capable of being tied by twisting on a wire reinforced ribbon. The prior art type of spool assembly 10 illustrated in FIGS. 1 through 3 comprises a pair of end plates 11 and 12 secured to a tubular element 13 for storing the tying material or wire reinforced ribbon 14, as illustrated in FIGS. 2 and 3 in particular. The specific feature of these prior art spool assemblies 10 under consideration herein is that the end plates 11 and 12 are normal to the ribbon storage member 13. For most practical applications a spool assembly constructed in this fashion is satisfactory. It has been found, however, that in the tying machine employing the wire reinforced ribbon that when the spools 10 are caused to intermittently rotate for feeding the tying material 14 to the tying station of the machine at high speeds that the tying material 14 tends to travel between one of the end plates 11 or 12 and the remaining tie material stored on the spool, in the fashion illustrated in FIG. 3. It should be evident by examining FIG. 3 that the binding or locking of the tie material 14 between the end plate 12 and the remaining tie material stored on the spool 10 will prevent the continuous feeding of the tie material from the spool 10. It should also be evident that with the continuous application of tension applied to the end of the tie material 14, when it is bound in this fashion, will cause the material to travel further down towards the tubular element 13 and lock up the machine even tighter. To prevent such action between the tie material 14 and the spool assembly 10 there has been developed and presently in use tension control devices for controlling the tension of the tie material 14 as it is fed from the spool 10. This, of course, introduces additional cost into the over-all machine and does not guarantee proper operation at all times.

With the above prior art spool construction in mind, the spool assembly 20 of the present invention will now be examined. The spool assembly 20 comprises a pair of end plates 21 and 22 and a material storage element shown as a tubular element 23. From a cost standpoint the tubular element 23 may be constructed of cardboard while the end plates 21 and 22 may be constructed of an injection molded, high impact, styrene plastic material.

Each of the end plates 21 and 22 are designed with an outwardly extending hub portion 21a and 22a, respectively, to be interfitted into the opposite ends of the tubular member 23 whereby the ribbon storage area is defined between the side plates. Each of the side plates have a central aperture similar to the aperture 21A illustrated for the end plate 21 in FIG. 4 and which aperture is coaxial with the tubular element 23 to allow the spool assembly 20 to be rotatably mounted to a tying machine.

An important feature of the spool assembly 20 is the construction of the end plates 21 and 22 with respect to the tubular element 23 to prevent the aforementioned binding up of the wire reinforced tie material 14 as described hereinabove. For this purpose the end plates 21 and 22 are both constructed and defined with a draft extending outwardly of the plane normal to the tubular element 23 and which draft is illustrated in FIG. 6 by an angle $\alpha$. The angle $\alpha$ is generally defined as a small angle with respect to the normal to the plane of the ribbon storing member 23 to allow the wire reinforced ribbon to be removed from the spool 20 without causing it to bind between the end plate and the remaining material stored thereon. For this purpose, one practical example of the angle $\alpha$ is in an angle of 5 degrees, as shown in FIG. 6.

It has been found that when the spool assembly 20 of the present invention is employed in the high speed tying machines that the tie material 14 may be fed from the spool at an intermittent rate at high speed without causing the binding or locking-up of the tying material. It has been further found that this advantage results without the resorting to any auxiliary devices such as the tension control device employed heretofore with the conventional spool assembly 10.

It should now be apparent to those skilled in the art that the present invention comprises an improved spool assembly for storing a continuous length of wire reinforced ribbon capable of being tied by twisting and adapted for high speed tying machines employing such tying ribbons.

What is claimed is:

1. A wound package including in combination a spool and ribbon-like tying material capable of being tied by twisting stored thereon, said spool comprising
    a cylindrical member,
    a pair of end flanges arranged on opposite ends of the cylindrical member to form a unitary spool assembly, each of the end flanges being defined with a draft extending outwardly of said cylindrical member from a plane extending through the adjacent end of the cylindrical member, the draft being defined to allow the material stored thereon to be freely wound and unwound from the spool without binding, and
    said ribbon-like tying material being wound on the cylindrical member in overlying convolutions, said material having a substantially flat cross-section with a width substantially less than the distance between the end flanges and greater than the depth of the material.

2. A wound package as defined in claim 1 wherein the draft is on the order of five degrees.

3. A wound package as defined in claim 1 wherein the cylindrical member and each of the end flanges have coaxial apertures to allow the spool to be rotatably mounted for winding and unwinding the tying material therefrom.

References Cited

UNITED STATES PATENTS

| | | |
|---|---|---|
| 1,104,325 | 7/1914 | Stewart. |
| 2,314,749 | 3/1943 | Willner. |
| 2,720,179 | 10/1955 | Strocco. |
| 2,771,849 | 11/1956 | Galbreath. |
| 3,105,655 | 10/1963 | Park et al. |

FOREIGN PATENTS

| | | |
|---|---|---|
| 147,244 | 7/1952 | Australia. |

GEORGE F. MAUTZ, *Primary Examiner.*

U.S. Cl. X.R.

242—118.61